United States Patent Office 3,433,804
Patented Mar. 18, 1969

3,433,804
BASIC-SUBSTITUTED DITHIENYLMETHYL- AND THIENYLPHENYLMETHYL ETHERS AND A PROCESS OF MAKING SAME
Roderich Höllinger and Wolf Wendtlandt, Linz, Austria, assignors to Osterreichische Stickstoffwerke Aktiengesellschaft, Linz, Austria
No Drawing. Filed Mar. 21, 1966, Ser. No. 535,695
Claims priority, application Austria, Mar. 22, 1965, A 2,558/65
U.S. Cl. 260—332.3         12 Claims
Int. Cl. C07d 63/12; A61k 27/00

ABSTRACT OF THE DISCLOSURE

Basic methyl ethers of the formula

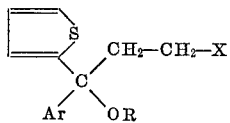

wherein Ar is phenyl or thienyl, R is lower alkyl and X is di(lower)alkylamino or piperidino, their nontoxic salts and their alkyl ammonium halides which have a cough suppressing effect. The process of preparing such ethers by reacting dithienyl or thienylphenyl-methyl ethers with alkali metal amides and subsequently with basically substituted alkyl halides, both steps being carried out in liquid ammonia as solvent.

This invention relates to basic ethers, acid addition salts and alkyl ammonium halides thereof and to a process for the preparation thereof.

In accordance with the present invention there is provided a basic ether having the formula:

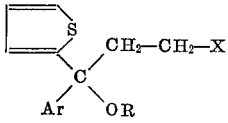 (I)

in which Ar is a phenyl or 2-thienyl ring, R is an alkyl group containing up to four carbon atoms and X is a di(lower)alkylamino group or a piperidino group, nontoxic acid addition salts and alkyl ammonium halides thereof.

The compounds of this invention have a very good cough-suppressing effect which in its effectiveness is about equivalent to that of codeine. Thus, for example the compound 1-thienyl-(2')-1-phenyl-1 - ethoxy - 3 - diethylaminopropane has an $ED_{50}$ of about 25 mg./kg. when tested on guinea pigs in a mist chamber by means of a spray of 20% citric acid.

The compounds of Formula I are distinguished from codeine by the fact that they do not show any depressive effect on breathing, which is characteristic of narcotic cough medicines and which is considered to be a disadvantage thereof. On the contrary, the compounds of this invention have a breathing-stimulating effect which is considered desirable in such cough medicines. The compounds of Formula I are further distinguished by an advantageous ratio of toxicity to effectiveness so that they have a favourable therapeutic breadth of application. They are therefore well suited for use as substances for suppressing cough irritation, and are preferably administered orally for this purpose, in admixture with a pharmacologically acceptable carrier, for example in the form of tablets, dragées or syrup.

The invention also provides a process for the preparation of a basic ether having the Formula I which comprises reacting a diarylmethyl ether having the formula:

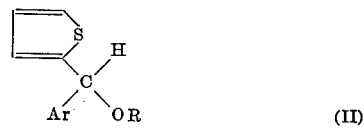 (II)

in which Ar and R are as defined above, in liquid ammonia as the solvent, with at least an equimolar amount of an alkali metal amide, and reacting the resulting alkali metal compound having the formula:

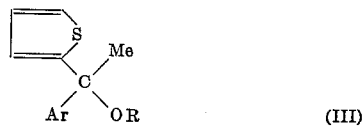 (III)

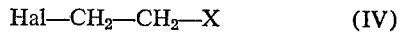

in which Me is an alkali metal atom and Ar and R are as defined above, again in liquid ammonia, with a basic substituted alkyl halide having the formula:

$$Hal—CH_2—CH_2—X \quad (IV)$$

in which Hal is a halogen atom and X is as defined above, or with a salt thereof, and thereafter isolating the resulting base or salt, the pH of the reaction mixture being maintained at a value of at least 4 during working up. The free base so obtained may be converted into an acid addition salt, or may be converted into an alkyl ammonium halide by reaction with an alkyl halide.

In order to carry out the reaction the alkali metal compound of Formula III is first of all prepared by reacting the ether of Formula II with an alkali metal amide, for example with sodium amide, potassium amide, or lithium amide in liquid ammonia. For this reaction it is advantageous to form the alkali metal amide in situ in liquid ammonia by adding an alkali metal and a suitable catalyst, for example ferric nitrate, to ammonia, and only then introducing the ether of Formula II. Alternatively, it is possible to start directly from the finished alkali metal amide. At least 1 mole of alkali amide per mole of ether is necessary for the reaction but the alkali metal amide may also be used in excess.

During the condensation with the basic substituted alkyl halide of Formula IV it is often advantageous to add the compound of Formula IV to the reaction medium as a solution in an inert solvent, for example ether. The compounds of Formula IV may, however, also be used in the form of their salts, but in that case the amount of alkali metal amide has to be increased so that a sufficient excess is present for it to bind the acid ion. The working up of the reaction mixture is preferably started by distilling off the ammonia with gentle warming. The basic ether may then be extracted from the reaction mixture with a mineral acid, the pH value not being allowed to fall below 4, since ether compound easily hydrolyses in acid solution. It is therefore advisable to take up the reaction mixture in a buffer solution having a pH of 4 before acidification. After appropriate washing, the base may be isolated from this mixture by rendering it alkaline. If the corresponding salt of the basic ether is of low solubility in water, it precipitates on acidification and may be isolated in the solid form. The salt so obtained may be converted to the base in the usual manner. It is also possible to produce other salts of the compounds. Examples of acid addition salts which may be produced are: hydrohalides, sulphates, succinates, tartrates and cyclohexylsulphamates. Examples of quaternary ammonium compounds are the methyl halides.

The ether of Formula II used as the starting compound may be obtained by etherification of the appropriate secondary carbinol with the appropriate alcohol in acid medium. These ethers have hitherto not been described in the literature.

The following examples illustrate the invention.

EXAMPLE 1

7.2 g. of potassium are stirred with 700 cc. of liquid ammonia, to which 30 mg. of ferric nitrate have been added as catalyst, until the blue colouration disappears. 19.3 g. of dithienyl carbinol methyl ether in 100 cc. of ether are then added dropwise followed by a solution of 30.0 g. of beta-diisopropylaminoethyl chloride in 100 cc. of ether. After stirring for a further half hour the ammonia is distilled off with gentle warming, with a simultaneous addition of ether, and the reaction product is treated with 200 cc. of acetate buffer having a pH of 4. The mixture is treated dropwise with hydrochloric acid until a pH of 4 is reached, the layers are separated, and the aqueous layer is rendered alkaline and extracted with ether. On distillation at 137° to 140° C. and 0.1 torr, 18.7 g. of 1,1-dithienyl-(2')-1-methoxy-3-diisopropylaminopropane are obtained, corresponding to a yield of 61% of theory. The hydrochloride of melting point 140° to 142° C. is obtained by dissolving the base in ether and careful precipitation with ethereal hydrochloric acid, with any excess being absolutely avoided.

The following compounds are obtained in a similar manner:

1,1-dithienyl-(2')-1-methoxy - 3 - diethylaminopropane: Boiling point of the base 120° to 123° C./0.05 torr; melting point of the hydrochloride 120° to 122° C., starting from the new dithienyl-(2)-carbinol methyl ether of boiling point 142° C./7 torr; $n_D^{23}=1.5932$ 1,1-dithienyl-(2')-1-ethoxy-3-diethylaminopropane: Boiling point of the base 126° to 128° C./0.05 torr; melting point of the hydrochloride 139° to 142° C. starting from the new dithienyl-(2)-carbinol ethyl ether, boiling point 148° to 150° C./8 torr; melting point 31° to 34° C.

1,1-dithienyl-(2')-1-ethoxy - 3 - dimethylaminopropane: Boiling point of the base 120° to 125° C./0.05 torr; melting point of the base 52° to 55° C.; melting point of the hydrochloride 144.5° to 145.5° C.

1,1-dithienyl-(2')-1-methoxy - 3 - dimethylaminopropane: Boiling point of the base 123° to 126° C./0.1 torr; melting point of the base 40° to 45° C.; melting point of the hydrochloride 160° to 164° C.

1,1-dithienyl - (2')-1-ethoxy-3-diisopropylaminopropane: Boiling point of the base 138° to 144° C./0.05 torr; melting point of the hydrochloride 154° to 156.5° C.

1-thienyl-(2')-1-phenyl-1-methoxy - 3 - diethylaminopropane: Boiling point of the base 123° to 124° C./0.1 torr; melting point of the hydrochloride 138° to 140° C. starting from the new phenyl-thienyl-(2)-carbinol methyl ether; boiling point 150° to 152° C./11 torr; $n_D^{22}=1.5782$.

1-thienyl - (2')-1-phenyl-1-methoxy-3-diisopropylaminopropane: boiling point of the base 126° to 128° C./0.07 torr; melting point of the base 38° to 44° C.; melting point of the hydrochloride 142° to 144° C.

1-thienyl - (2')-1-phenyl-1-methoxy-3-dimethylaminopropane: boiling point of the base 124° C./0.1 torr; melting point of the base 47° to 49° C.; melting point of the hydrochloride 166° to 169° C.

1-thienyl-(2')-1-phenyl-1-ethoxy - 3 - diethylaminopropane: boiling point of the base 121° to 123° C./0.07 torr; melting point of the hydrochloride 123° to 126° C.; starting from the new phenyl-thienyl-(2)-carbinol ethyl ether; boiling point 149° to 153° C./9 torr; $n_D^{20}=1.5645$ 1-thienyl-(2')-1-phenyl-1-ethoxy - 3 - diisopropylaminopropane: boiling point of the base 137° to 139° C./0.1 torr; melting point of the hydrochloride 143° to 146° C.

1-thienyl-(2')-1-phenyl-1-ethoxy - 3 - dimethylaminopropane: boiling point of the base 121° C./0.1 torr; melting point of the base 35° to 38° C.; melting point of the hydrochloride 152° to 156° C.

1-thienyl-(2')-1-phenyl - 1 - methoxy - 3 - piperidinopropane: boiling point of the base 145° to 149° C./0.05 torr; melting point of the base 65° to 70° C.; melting point of the hydrochloride 178° to 180° C.

1 - thienyl - (2')-1-phenyl-1-ethoxy-3-piperidinopropane: boiling point of the base 149° C./0.05 torr; melting point of the base 43° to 48° C.; melting point of the hydrochloride 164° to 166° C.

1,1-dithienyl-(2')-1-methoxy-3-piperidinopropane: boiling point of the base 154° C./0.1 torr; melting point of the base 55° to 60° C.; melting point of the hydrochloride 158° to 160° C.

1,1-dithienyl-(2')-1-ethoxy-3-piperidinopropane: boiling point of the base 145° C./0.05 torr; melting point of the base 44° to 52° C.; melting point of the hydrochloride 135° to 137° C.

EXAMPLE 2

1.8 g. of 1-thienyl-(2')-1-phenyl-1-ethoxy-3-diethylaminopropane are dissolved in 40 cc. of ether and treated with 4 g. of methyl iodide. After one day the resulting precipitate is filtered off and recrystallised from alcohol. The melting point of the 3-thienyl-(2')-3-phenyl-3-ethoxypropyl diethyl methyl ammonium iodide is 173° to 174° C.

We claim:

1. A basic ether selected from the group consisting of compounds having the formula

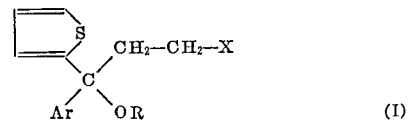 (I)

in which Ar is selected from the group consisting of phenyl and 2-thienyl, R is an alkyl group containing up to four carbon atoms and X is selected from the group consisting of di(lower)alkylamino and piperidino group, the nontoxic acid addition salts and the lower alkyl ammonium halides thereof.

2. A compound selected from the group consisting of 1-thienyl - (2') - 1 - phenyl - 1 - ethoxy - 3 - diethylaminopropane, nontoxic acid addition salts and lower alkyl ammonium halides thereof.

3. A compound selected from the group consisting of 1,1 - dithienyl - (2') - 1 - methoxy - 3 - diisopropylaminopropane, nontoxic acid addition salts and lower alkyl ammonium halides thereof.

4. A compound selected from the group consisting of 1 - thienyl - (2') - 1 - phenyl - 1 - methoxy - 3 - diisopropylaminopropane, nontoxic acid addition salts and lower alkyl ammonium halides thereof.

5. 1 - thienyl - (2') - 1 - phenyl - 1 - ethoxy - 3 - diethylaminopropane hydrochloride.

6. 1 - thienyl - (2') - 1 - phenyl - 1 - methoxy - 3 - diisopropylaminopropane hydrochloride.

7. 1,1 - dithienyl - (2') - 1 - methoxy - 3 - diisopropylaminopropane hydrochloride.

8. 1,1 - dithienyl - (2') - 1 - methoxy - 3 - diisopropylaminopropane.

9. 1 - thienyl - (2') - 1 - phenyl - 1 - ethoxy - 3 - diethylaminopropane.

10. A process for the preparation of a basic ether selected from the group consisting of compounds having the formula

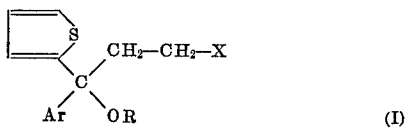

in which Ar is selected from the group consisting of phenyl and 2-thienyl, R is an alkyl group containing up to four carbon atoms and X is selected from the group consisting of di(lower)alkylamino and piperidino group and the nontoxic acid addition salts thereof, which comprises reacting a diarylmethyl ether having the formula

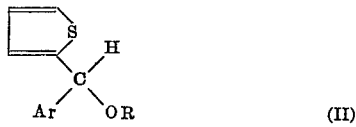

in which Ar and R are as defined above, in liquid ammonia as the solvent, with at least an equimolar amount of an alkali metal amide, reacting the resulting alkali metal compound having the formula:

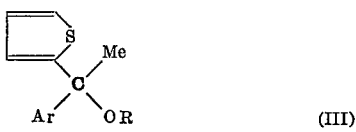

in which Ar and R are as defined above and Me is an alkali metal atom, again in liquid ammonia as the solvent, with a basic substituted alkylhalide selected from the group consisting of compounds having the formula

in which Hal is an halogen atom and X is as defined above, and the nontoxic acid addition salts thereof, and thereafter isolating the resulting base or salt, the pH of the reaction mixture being maintained at a numerical value of at least 4 during working up.

11. A process according to claim 10, in which the alkali metal amide used in the production of the alkali metal compound of Formula III is formed in situ in the liquid ammonia used as the solvent for the reaction.

12. A process according to claim 10, in which the basic substituted alkyl halide of Formula IV is introduced in the form of a solution in an inert organic solvent.

References Cited

UNITED STATES PATENTS 2,989,533    6/1961    Stein et al. _____ 260—294.3

FOREIGN PATENTS 811,659    4/1959    Great Britain.

OTHER REFERENCES

Burger: Medicinal Chemistry (Interscience, New York, 1960), pp. 490–2.

Kaye et al.: JACS, 74; 3676–9 (1952).

Kasé et al.: Chem. & Pharm. Bull. 7: 372–3 (1959).

Fieser et al.: Adv. Org. Chem. (Reinhold, New York, 1961), pp. 112–3.

Theilheimer: Syn. Meth. of Org. Chem. (Kasger, New York, 1962), vol. 16, p. 385, item 866.

Burger: Medicinal Chemistry (Interscience, New York, 1960) pp. 672–3.

HENRY R. JILES, *Primary Examiner.*

C. M. SHURKO, *Assistant Examiner.*

U.S. Cl. X.R.

260—293.45; 424—267, 275